United States Patent [19]
Smith

[11] 3,724,598
[45] Apr. 3, 1973

[54] POWER TRANSMISSION WITH LUBRICATING MEANS

[75] Inventor: Edson W. Smith, Elmira, N.Y.

[73] Assignee: American LaFrance Inc., Willoughby, Ohio

[22] Filed: Aug. 25, 1971

[21] Appl. No.: 174,780

[52] U.S. Cl. ................................. 184/6.1, 184/6.12
[51] Int. Cl. ............................................. F01m 1/12
[58] Field of Search ..184/6.12, 6.28, 15 R, 13, 27 R, 184/6.1

[56] References Cited

UNITED STATES PATENTS

| | | | |
|---|---|---|---|
| 2,650,626 | 9/1953 | Kiekhaefer | 184/15 R X |
| 2,403,579 | 7/1946 | Carpenter | 184/6.12 |
| 3,650,353 | 3/1972 | Abbott | 184/6.12 |
| 2,466,320 | 4/1949 | Lawrence | 184/6.12 X |
| 3,448,829 | 6/1969 | Rauhetal | 184/15 R X |

Primary Examiner—Manuel A. Antonakas
Attorney—Webster B. Harpman

[57] ABSTRACT

A power transmission with lubricating means is adapted for alternately driving a wheeled vehicle and a pump mounted thereon and varies the quantity and application of the lubricant in the transmission to provide desirable quantity and application of the lubricant for each of the alternate operations.

5 Claims, 3 Drawing Figures

INVENTOR.
EDSON W. SMITH
BY
W. B. Harfman
ATTORNEY

POWER TRANSMISSION WITH LUBRICATING MEANS

BACKGROUND OF THE INVENTION

1. Field of the Invention:

This invention relates to power transmissions of the type used in fire apparatus to transmit engine power from the road transmission to the rear axle or to the fire pump.

2. Description of the Prior Art:

Prior power transmissions of this type have employed gear drive means and pumps for circulating lubricant, see for example, U.S. Pat. No. 3,083,790. This invention eliminates the uncertainties of the lubrication systems heretofore known in the art and provide a novel function in varying the quantity of lubricant present while improving the overall lubrication and increasing efficiency of the power transmission.

SUMMARY OF THE INVENTION

A power transmission with lubricating means selectively couples a front drive shaft of a vehicle with a rear drive shaft thereof and a fire pump impeller shaft by means of an internally splined clutch collar slideably engaging the front drive shaft for selective engagement with the rear drive shaft and alternately with chain and sprocket assemblies connecting with the fire pump impeller shaft.

A lubricant pump connected with the fire pump impeller shaft moves lubricant from the transmission to a reservoir externally thereof and provides spray lubrication of the chain and sprocket assemblies when the fire pump impeller shaft is driven thereby.

DESCRIPTION OF THE PREFERRED EMBODIMENT

Figure 1:
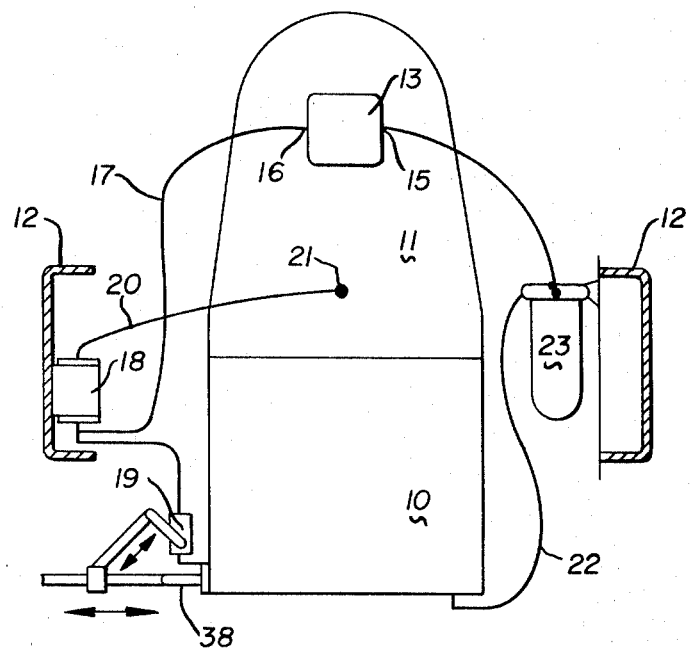
FIG. 1 is a symbolic diagram illustrating the power transmission with lubricating means.

As illustrated herein and in FIG. 1 in particular, the power transmission with lubricating means comprises a transmission case 10 having an upward extension 11 and normally disposed in fire apparatus for example, between the side rails 12 of the frame thereof and between the front and rear axles of the fire apparatus. An oil pump 13 is mounted externally of the upward extension 11 of the transmission case 10 and is driven by a fire pump impeller shaft 14 as may be seen by referring to FIG. 2 of the drawings and the upper portion thereof.

Referring again to FIG. 1 of the drawings it will be seen that the oil pump 13 has an inlet 15 and an outlet 16 with tubing 17 extending from the outlet 16 to a reservoir 18 and by way of a control valve 19 to the lower portion of the transmission case 10. Tubing 20 extends from the reservoir 18 to a spray head 21 which extends inwardly of the upper extension 11 of the transmission case 10 as best seen in FIG. 2 of the drawings.

Still referring to FIG. 1 of the drawings, it will be seen that tubing 22 extends from the lower portion of the transmission case 10 to the inlet 15 of the oil pump 13 by way of a filter 23. In FIG. 1 of the drawings the reservoir 18 and the filter 23 are seen attached to the side rails 12 of the fire apparatus and it will occur to those skilled in the art that they may alternately be attached directly to the transmission case 10 and/or the upper extension 11 thereof if desired.

Figure 2:
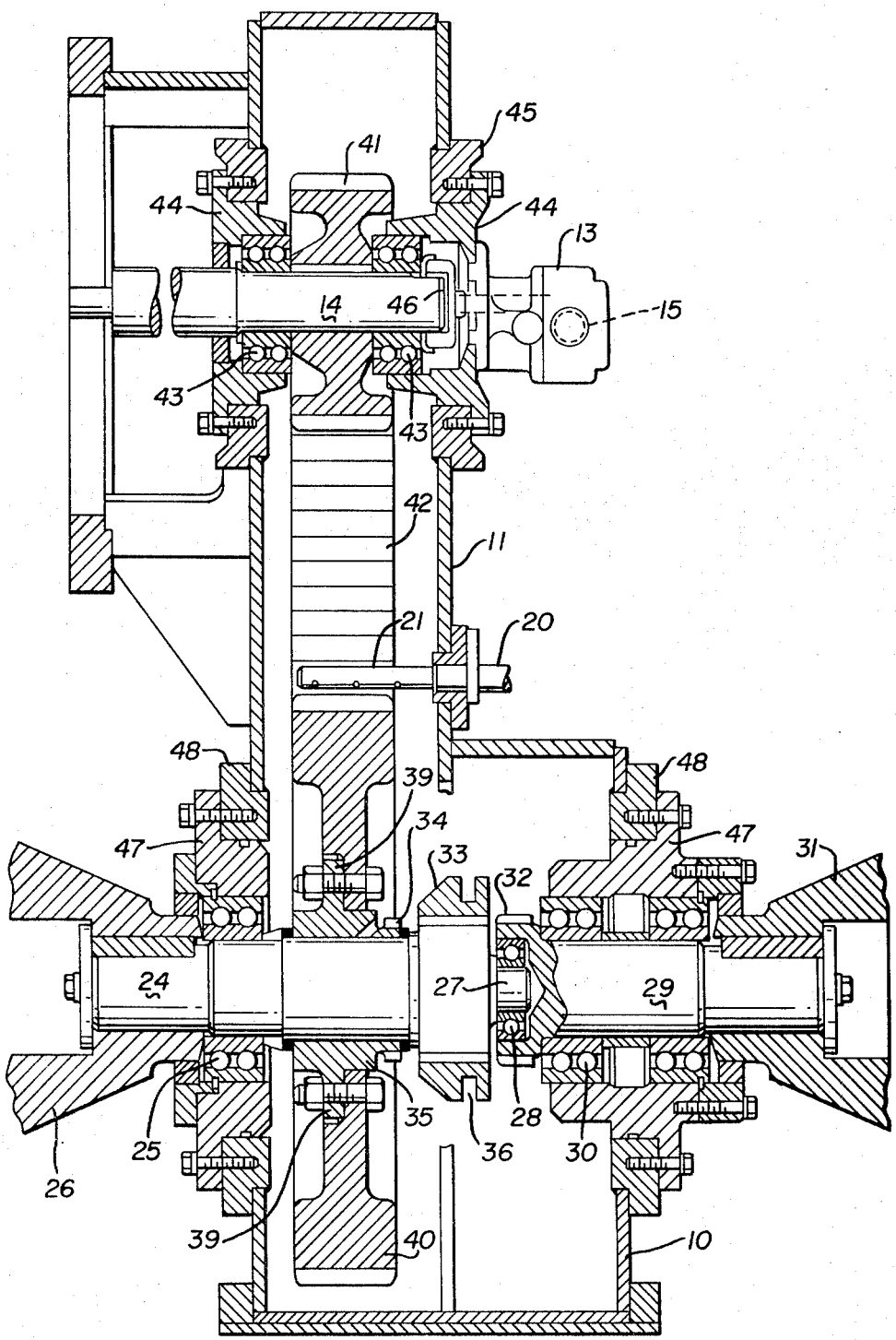

By referring now to FIG. 2 of the drawings, it will be seen that the transmission case 10 and its upward extension 11 adjustably journal a front drive shaft 24 supported on anti-friction bearings 25 and extending exteriorly of the transmission case 10 where it is coupled to a front propeller shaft 26 which extends from a motor driven transmission not shown. The front drive shaft 24 is therefore the source of motion in the power transmission with lubrication means disclosed herein. The inner or right end 27 of the front drive shaft 24 is of reduced diameter and is journaled in an anti-friction bearing 28 carried in the inner end of a rear drive shaft 29 which, in turn, extends through the wall of the transmission case 10 and is carried on anti-friction bearings 30.

Figure 3:
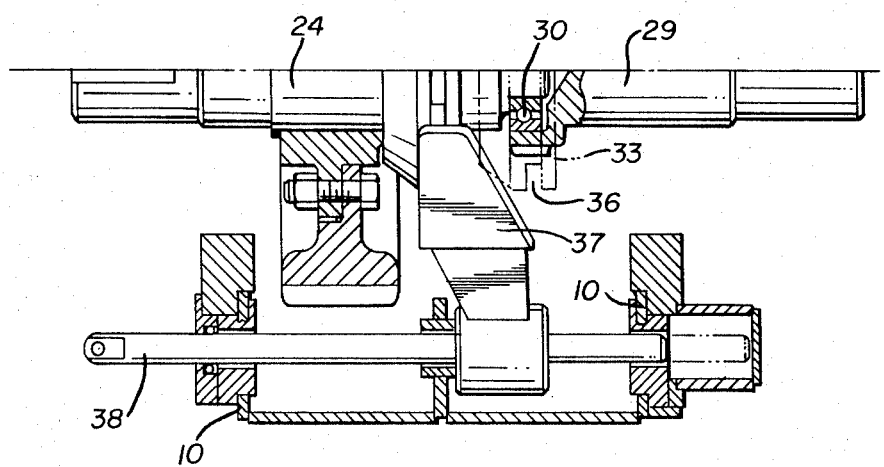
FIG. 2 is a vertical section through the power transmission with parts in cross section and parts broken away and FIG. 3 is a vertical section of an apparatus for shifting a splined clutch collar in the power transmission.

A rear propeller shaft 31 is secured to the rear drive shaft 29 and extends to the rear axle of the apparatus carrying the power transmission disclosed herein. The inner end of the rear drive shaft 29 is provided with a gear pattern 32 annularly thereof which is arranged to receive an internally splined clutch collar 33 which is slidably positioned on the front drive shaft 24 and arranged to be moved longitudinally thereof so as to engage the annular gear pattern 32 on the rear drive shaft 29 or an annular gear pattern 34 on a drive sprocket assembly 35 which is rotatably mounted on the front drive shaft 24 in side by side relation with the internally splined clutch collar 33. The clutch collar 33 is provided with an annular groove 36 in which a shift fork 37 is slideably engaged as may be seen by referring to FIG. 3 of the drawings. The shift fork 37 and its actuating rod 38 are disposed within the transmission case 10 below the front and rear drive shafts 24 and 29 respectively.

By referring again to FIG. 2 of the drawings, it will be seen that the drive sprocket assembly 35 consists of a hub having an annular flange 39 to which an annular sprocket 40 is bolted. In the upward extension 11 of the transmission case 10 a driven sprocket 41 is keyed to the fire pump impeller shaft 14 and a drive chain 42 is positioned over the drive sprocket 41 and the annular sprocket 40 of the drive sprocket assembly 35 so that motion imparted the latter will be conveyed to the former.

The fire pump impeller shaft 14 is journaled in the upper extension 11 of the transmission case 10 by anti-friction bearings 43 and the bearings 43 are positioned in discs 44 which, in turn, are secured to annular frames 45 in openings in the upward extension 11 of the transmission case 10. One of the discs 44 mounts the oil pump 13 heretofore referred to and the drive shaft thereof may be seen to be coupled to a drive nut 46 on the innermost end of the fire pump impeller shaft 14. The opposite portion of the fire pump impeller shaft 14 extends outwardly through an appropriate gland or seal in the upward extension 11 of the transmission case 10 and is coupled to the fire pump not shown.

Still referring to FIG. 2 of the drawings, it will be seen that the bearings 25 and 30 which support the front drive shaft 24 and the rear drive shaft 29 respectively are mounted in eccentric discs 47 which are bolted to annular frames 48 in the transmission case 10. The eccentric discs 47 carrying the drive and driven shafts of the power transmission make it possible for the vertical adjustment of these shafts relative to one another and hence, the desirable fitting of the drive chain 42 thereabout, as will occur to those skilled in the art.

OPERATION

In operation the power transmission with lubricating means receives motion from the forward propeller shaft so as to rotate the front drive shaft 24. This motion is transmitted to the rear drive shaft 29 when the equipped vehicle is operated on the road by engagement of the internally splined clutch collar 33 with the gear pattern 32 on the rear drive shaft 29. The internally splined clutch collar 33 is moved by the shift fork 37 heretofore described which, in turn, is moved by its actuating rod 38. Links and levers not shown are provided for operation of the shift rod 38 and an extension of these links and levers is used to operate the control valve 19 in the oil circuit as hereinbefore described in connection with FIG. 1 of the drawings. At such time as the internally splined clutch collar 33 is in driving relation to the rear drive shaft 29 and the wheels of the vehicle are being driven thereby, the control valve 19 is in open position so that the oil from the reservoir 18 will drain into the lower portion of the transmission case 10 and establish a suitable lubrication level for the bearings 25, 28 and 30 and the drive sprocket assembly where its hub rotates on the front drive shaft 24.

At such time as the fire pump on the equipped vehicle is to be operated, the shift rod 38 is manually moved to move the shift fork 37 and hence, the internally splined clutch collar 33 out of engagement with the gear pattern 32 on the rear drive shaft 29 and into engagement with the gear pattern 34 on the drive sprocket assembly 35, thereby imparting motion to the annular sprocket 40, the chain 42 and the driven sprocket 41 which is keyed to the fire pump impeller shaft 14. Simultaneously, with this action, extensions of the links and levers operating the shift rod 38 move the control valve 19 in the oil supply circuit to closed position so that oil from the transmission case 10, after passing through the filter 23 and the pump 13 flows into the reservoir 18 and to the spray head 21 in the upward extension 11 of the transmission case 10 which is advantageously positioned for lubricating the drive chain 42 and the drive sprocket assembly 35. A considerable quantity of the oil in the transmission case 10 is thus removed therefrom and positioned in the reservoir 18 and the oil remaining is supplied through the spray head 21 and circulated through the lubrication system as hereinbefore described.

It has been determined that by removing approximately half of the oil from the transmission case 10 to the reservoir 18, a greatly improved performance results which includes a very substantial drop in the oil temperature in the power transmission and a very desirable increase of usable horsepower while the apparatus is driving the pump at maximum capacity.

The hereinbefore described power transmission with lubricating means is advantageously located in fire apparatus to form a center bearing structure for the propeller shafts used for driving the axles of such apparatus and affords a practical highly efficient power take-off for the fire pump.

Although but one embodiment of the invention has been illustrated and described, it will be apparent to those skilled in the art that various changes and modifications may be made therein without departing from the spirit of the invention.

I claim:

1. In a power transmission having a case including a lower portion, lubricant in said lower portion at a certain normal operating level and a plurality of relatively movable machine parts requiring lubrication in said case some of which are above the normal operating level of the lubricant, a reservoir and a pump for moving some of said lubricant from said case to said reservoir, means for supplying said plurality of relatively movable machine parts above said normal operating level of the lubricant with lubricant from said reservoir, said pump connected to and driven by said movable machine parts above said normal operating level of the lubricant, clutch means for separating and engaging said relatively movable machine parts above said normal operating level of the lubricant from other of said machine parts whereby said lubricant is moved into said reservoir and supplied to said relatively movable machine parts above said normal operating level of the lubricant only when the same are engaged by said clutch means.

2. The improvement in power transmissions set forth in claim 1 wherein said reservoir when full holds less than the amount of lubricant in said transmission case at normal operating level, so as to act to lower the level of said lubricant in said case when said pump is actuated.

3. The improvement in power transmissions set forth in claim 1 wherein said other machine parts include a drive shaft and a driven shaft and said clutch means separates and engages said shafts.

4. The improvement in power transmissions set forth in claim 1 wherein said movable machine parts include a drive shaft, a driven shaft and a power take-off shaft, a sprocket rotatably mounted on said drive shaft, a secondary sprocket on said power take-off shaft and a chain trained over said sprockets, said pump being connected to and driven by said power take-off shaft, said clutch selectively separating and engaging said drive shaft with said driven shaft and said first mentioned sprocket.

5. The improvement in power transmissions set forth in claim 1 wherein communication means extends between said reservoir and said case and a control valve is located in said communication means, said control valve being responsive in operation to said clutch means so as to close said communication means when said pump is actuated thereby.

* * * * *